H. T. NORRIS.
OFFSET FOR PEDALS OF AUTOMOBILES.
APPLICATION FILED FEB. 1, 1919.
1,302,837.
Patented May 6, 1919.
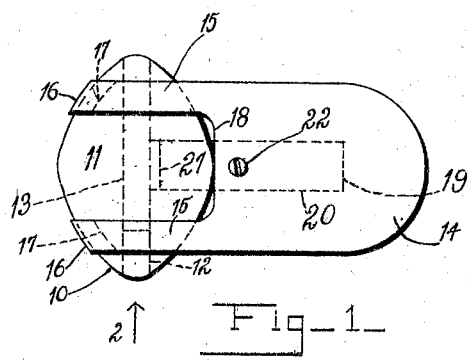
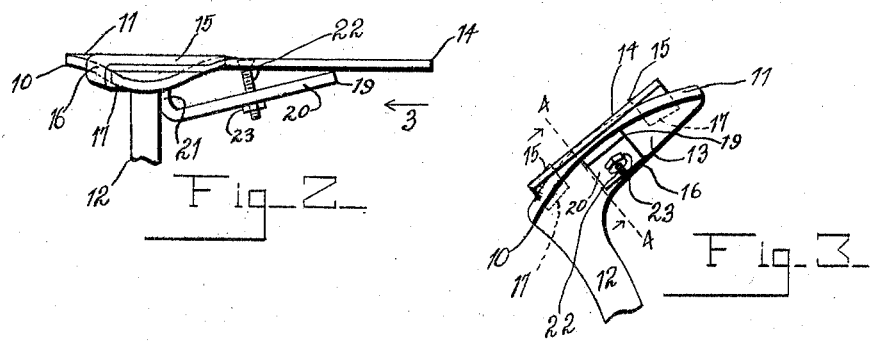
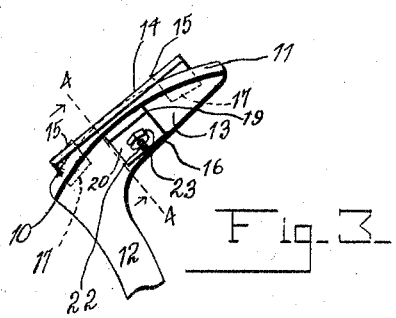
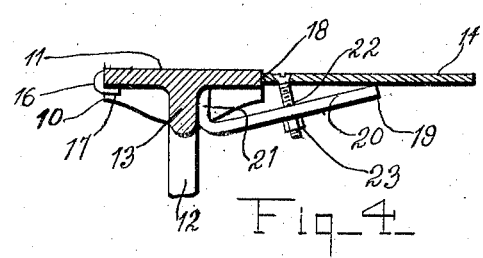
Inventor
Howard T. Norris
By John W. Llorley,
Attorney

UNITED STATES PATENT OFFICE.

HOWARD T. NORRIS, OF BALTIMORE, MARYLAND.

OFFSET FOR PEDALS OF AUTOMOBILES.

1,302,837.  Specification of Letters Patent.  Patented May 6, 1919.

Application filed February 1, 1919. Serial No. 274,457.

*To all whom it may concern:*

Be it known that I, HOWARD T. NORRIS, a citizen of the United States, residing at Baltimore, in the State of Maryland, have invented certain new and useful Improvements in Offsets for Pedals of Automobiles; and I do hereby declare the following to be a full, clear, and exact description of the invention, such as will enable others skilled in the art to which it appertains to make and use the same.

My invention relates to offset for pedals of automobiles.

One object of my invention is to produce an offset for attachment to the pedal of an automobile so that the person operating the automobile may keep his foot upon the pedal and the person instructing the operator may apply his foot to the offset when desired in order to make emergency stops. For this purpose the offset is intended primarily to be attached to the brake pedal of the automobile, but it is not limited in its application to the brake pedal only; it may be applied to any pedal of an automobile or to any pedal of any machine in which it is desirable to give the instructor an opportunity to control the operation of the machine without necessitating the removal of the foot of the operator from the pedal.

A further object of my invention is to produce an offset provided with a clamp therefor, the latter being so located and arranged that it will serve to continuously clamp the offset on the pedal and at the same time, will serve as a brace for supporting the free end of the offset.

A further object of my invention is to produce an offset for use on pedals of automobiles which shall be simple, cheap, strong and capable of ready attachment to and detachment from the pedal of an automobile.

In carrying out my invention, I make use of the instrumentalities illustrated in the accompanying drawings, in which:

Figure 1 is a plan view of a pedal with my improved offset secured thereto.

Fig. 2 is a view of the parts shown in Fig. 1 looking in the direction of the arrow 2 in said figure.

Fig. 3 is a view of the parts shown in Fig. 2 looking in the direction of the arrow 3 in said figure.

Fig. 4 is a section along the line 4—4 in Fig. 3 looking in the direction of the arrows.

In the drawings:

10 represents the brake pedal of an automobile provided with the usual approximately lozenge shaped top 11, the latter usually being curved as shown in side view in Fig. 3.

The lever portion 12 of the pedal 10 is shown broken away, but the lower end thereof is to be connected in any approved manner to the ordinary braking mechanism of the automobile with which said pedal is used. The lever 12 and the top 11 are joined together by the rib 13, all of these parts being usually formed integrally.

My improved offset consists of the plate 14 which may be semicircular in shape at its right hand end, as shown in Fig. 1, or may be of any approved shape. The plate 14 is provided at its left hand end with two prongs 15—15, and the latter at their left hand ends are bent downwardly as at 16—16 and then toward the right under the top 11, as at 17—17, as shown in Figs. 1, 2 and 4.

The parts 14, 15—15, 16—16, and 17—17 of my improved offset are preferably formed integrally of a piece of rolled sheet steel in order to provide great strength and light weight. An edge 18 is provided on the plate 14 between the prongs 15—15 and is so located that when the portions 16—16 and 17—17 of the prongs 15—15 embrace the top 11, as shown in the drawings, said edge 18 will embrace the right hand edge of the top 11 of the pedal as shown in Figs. 1, 2 and 4.

In order to provide additional strength for the plate 14 and to secure my improved offset upon the pedal 10, I provide the clamp 19 which consists of the body portion 20 which at its right hand, as shown in Figs. 1, 2 and 3, bears against the underside of the plate portion 14. The clamp 19 is provided at its left hand end with a clamping finger 21, the upper end of which rests in the angle between the bottom of the top 11 and the right side of the rib 13, and the left face of which, (see Fig. 4), rests against the right face of the rib 13.

The clamp 19 is secured to the plate 14 by the screw 22 which passes through a hole in the latter and through a hole in the body 20 of said clamp, and a nut 23 is threaded upon the lower end of the screw 22.

The manner of use and operation of my improved offset is as follows:—

The portions 16 and 17 of the plate 14 are to be placed around the edge of the top 11 of the pedal 10 in substantially the same position shown in Fig. 1 but with the plate 14 somewhat in a counter clockwise position from the position shown in Fig. 2. The plate 14 is then to be pressed downwardly so that the edge 18 will embrace the right hand edge of the top 11 as shown in Figs. 1, 2 and 4. In order to prevent the plate 14 from moving upwardly from the position shown in said figures and to provide additional strength, the clamp 19 is then placed in the position shown in said figures and secured therein by the screw 22 and nut 23.

It is to be noted that the clamp 19 is angularly disposed with reference to the plate 14 as shown in Fig. 4 and that the screw 22 is disposed substantially at right angles to the body 20 of the clamp 19 as shown in Fig. 4 so that when the nut 23 is tightened up there will be an element of the stress produced thereby which will force the left face, (see Fig. 4), of the finger 21 against the rib 13, and will press the portions 16—16 tightly against the left edge of the top 11 of the pedal 10, thus serving to tightly secure the plate 14 upon said pedal.

It is also to be noted that by reason of having the left face of the finger 21 bearing against the right face of the rib 13, a brace is formed by the portion 20 of the clamp 19 which serves to support the outer edge of the plate 14.

While I have shown my improved offset as arranged for use with automobile pedals, it is to be understood that, as hereinbefore stated, it may be used upon any pedals of any machine for which it is desirable to provide for dual control.

It is also evident that many changes may be made in my improved offset without departing from the spirit of my invention.

I claim:—

1. In an offset for use with pedals comprising a top and rib, the combination with a plate, of prongs thereon having bent portions to embrace one edge of said top, a clamp having a finger one side of which rests against said rib and the end of which rests against said top, and a screw for pressing said finger against said rib and top.

2. In an offset for use with pedals comprising a top and rib, the combination with a plate, of prongs thereon having bent portions to embrace one edge of said top, a clamp bearing at one end against said plate and having a finger on the other end one side of which finger rests against said rib and the upper end of which finger rests against said top, and a screw for pressing the end of said clamp against said plate, the side of said finger against said rib and the end of said finger against said top.

In testimony whereof, I affix my signature.

HOWARD T. NORRIS.

Copies of this patent may be obtained for five cents each, by addressing the "Commissioner of Patents, Washington, D. C."